United States Patent [19]

Ginnings

[11] Patent Number: 4,496,704
[45] Date of Patent: Jan. 29, 1985

[54] HIGH SLIP POLYESTER FILMS CONTAINING SILOXANE UNITS

[75] Inventor: Paul R. Ginnings, Wadsworth, Ohio

[73] Assignee: The Goodyear Tire & Rubber Company, Akron, Ohio

[21] Appl. No.: 472,514

[22] Filed: Mar. 7, 1983

[51] Int. Cl.³ .................... C08G 63/46; C08G 77/46
[52] U.S. Cl. ................................. 528/26; 525/446; 525/474; 528/27; 528/29; 528/272
[58] Field of Search ............... 525/474, 446; 528/26, 528/27, 29, 272

[56] References Cited

U.S. PATENT DOCUMENTS 3,701,815 10/1972 Matzner et al. .................... 525/446
3,749,757 7/1973 Marzocchi ......................... 525/446
4,348,510 9/1982 Keck et al. ........................ 525/474

Primary Examiner—Wilbert J. Briggs, Sr.
Attorney, Agent, or Firm—Alvin T. Rockhill

[57] ABSTRACT

This invention provides for novel linear thermoplastic block copolyesters derived from dicarboxylic acids or dialkyl esters thereof, alkylene glycols and dihydroxy terminated polydimethylsiloxane block copolymers. Films, tapes, sheeting and other extruded and molded articles prepared from said copolyesters exhibit improved clarity and improved nonsticking properties.

9 Claims, No Drawings

HIGH SLIP POLYESTER FILMS CONTAINING SILOXANE UNITS

TECHNICAL INFORMATION

This invention relates to compositions of matter comprising novel copolyesters and products made therefrom. More particularly this invention relates to novel random linear thermoplastic block copolyesters useful in the preparation of such products as films, tapes, sheeting and other extruded and molded articles which articles exhibit and are characterized by their improved clarity, appearance and slip or nonblocking tendencies as evidenced by their reduced static and kinetic coefficients of friction.

BACKGROUND OF THE INVENTION

Various linear polyesters and copolyesters have been prepared for subsequent conversion into products such as films, tapes and sheeting. These polyesters and copolyesters are all polymeric compounds containing in their structural units, ester groups of the type derived from the interreaction of organic dicarboxylic acids or lower alkyl esters thereof and dihydric glycols. Film, tape and sheeting products prepared from these polyesters and copolyesters have very smooth surfaces, a highly desirable characteristic, but because of this smoothness have such an affinity for each other that when wound, stacked or otherwise brought into contact with each other will tend to stick together even when subjected to only the slightest of pressures. This tendency to stick or "block" gives rise not only to problems during the preparation of such products, but also contributes to a diminution in their appearance qualities as a result of surface-to-surface abrasion during subsequent handling of such products.

In order to minimize or prevent the tendency of such products to stick or block together when brought into contact with each other, past practice has been to add to the polyester or copolyester what is commonly referred to in the industry as a slip or nonblocking agent. Generally, slip or nonblocking agents consist of finely dispersed materials which reduce the coefficient of friction between adjacent surfaces of the products when brought into contact with each other. Examples of slip or nonblocking agents which have been employed in the past are such materials as silica, quartz, aluminum silicate, kaolin, calcium phosphates and the like. However, the use of such inorganic materials have two major drawbacks. The first of these is that, being inorganic, these materials are not soluble in the polyester or copolyester and thus impart an objectional haze in the final extruded or molded product. The second drawback is that such inorganic materials are difficult to disperse uniformly throughout the polyester or copolyester, frequently leading to the formation of agglomerates. These agglomerates not only cause difficulties during the processing of the polyester or copolyester into films, tapes, sheeting or other like products but also impart objectionable characteristics to the product such as impairment of clarity, interference with x-ray transmission or interference with audio and visual reproduction. Organic slip agents such as fatty acid amides have also been suggested, but these function by migration of the amide to the surface of the film or tape thereby limiting the uses to which polyesters containing these agents can be applied.

In contrast to past practice the present invention offers an attractive alternative to the use of inorganic and/or organic slip agents and the drawbacks associated therewith.

The inventor has found that when a block copolyester as taught in U.S. Pat. No. 4,348,510 is extruded into a film and subsequently biaxially oriented, the film suffers from commercially unacceptable static coefficient of friction, however, it has acceptable levels of haze. The inventor has also found that in levels in excess of 12% by weight that the block copolyester when extruded and subsequently biaxially oriented, may be unacceptable due to a high percentage of haze (excess of 14%) while having excellent static coefficient of friction. Unlike the copolyesters disclosed in U.S. Pat. No. 4,348,510, the copolyesters of the present invention do not have to be "conditioned" in accordance with ASTM test method D-1894-78 in order to exhibit improved nonsticking properties. Accordingly, the inventor has unexpectedly found that levels from 5.0% to 12% in a copolyester which is then extruded into a film and subsequently biaxially oriented has excellent slip characteristics in the absence of conditioning as well as maintaining excellent haze values (from 3.5% to 14.0%).

DISCLOSURE OF THE INVENTION

The present invention provides for random, linear thermoplastic block copolyesters, extruded and molded articles of which exhibit improved clarity and nonsticking characteristics, consisting essentially of the polymeric reaction product of a mixture of reactants comprising (A) at least one reactant selected from the group consisting of (1) aromatic dicarboxylic acids or the $C_1$ to $C_4$ dialkyl esters thereof and (2) aliphatic dicarboxylic acids or $C_1$ to $C_4$ dialkyl esters thereof wherein the reactant or reactants selected from group (A)(1) constitute from 100 to 50 mol percent of the total mols of said reactant (A) and the reactant or reactants from group (A)(2) constitute from 0 to 50 mol percent of the total mols of said reactant (A), (B) from about 100 to about 300 mol percent, based on the total mols of reactant (A) in said mixture of reactants, of at least one reactant selected from the group consisting of alkylene glycols containing from 2 to 10 carbon atoms and (C) from 5.00 to about 12.00 weight percent, based on the weight of said polymeric reaction product, of a dihydroxy terminated polydimethylsiloxane block copolymer of the general formula

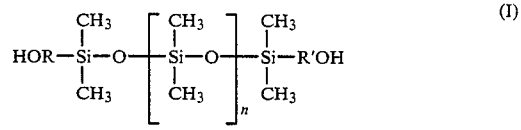 (I)

wherein n is an integer ranging from about 8 to about 15 and R and R' are divalent polymethylene oxide radicals corresponding to the formulae

 (II)

and

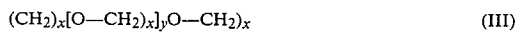 (III)

respectively and wherein x is an integer ranging from about 2 to about 8 and y is an integer ranging from about 8 to about 15 to provide said block copolymer with a molecular weight ranging from about 1600 to about 5500.

In a preferred embodiment the invention provides for random, linear thermoplastic block copolyesters consisting of the polymeric reaction product of the mixture of reactants (A), (B) and (C) defined hereinabove wherein reactant (A) is selected from said (A)(1) reactants consisting of aromatic dicarboxylic acids or the $C_1$ to $C_4$ dialkyl esters thereof, reactant (B) is selected from alkylene glycols containing from 2 to 6 carbon atoms and reactant (C) is a dihydroxy terminated polydimethylsiloxane block copolymer as defined in the general formula (I) set forth above wherein the integer n ranges from about 10 to about 13 and wherein the integers x and y of the divalent radical R and R' set forth in formulae (II) and (III) hereinabove range from about 2 to about 4 and from about 10 to about 13 respectively. In a more preferred embodiment the invention provides for random, linear thermoplastic block copolyesters consisting of the polymeric reaction product of the mixture of reactants (A), (B) and (C) wherein reactant (A) is selected from the group consisting of terephthalic acid or its dialkyl ester, dimethyl terephthalate, wherein reactant (B) ranges from about 100 to about 250 mol percent based on the total mols of reactant (A) and is ethylene glycol and wherein reactant (C) is a dihydroxy terminated polydimethyl siloxane block copolymer of the general formula (I) above wherein the integer n ranges from about 10 to about 13, the integer x of the divalent radicals R and R' as depicted in formulae (II) and (III) above is 2 and the integer y therein ranges from about 10 to about 13 to provide a dihydroxy terminated polydimethylsiloxane block copolymer having a molecular weight ranging from about 1900 to about 2400 and wherein said reactant (C) is present in said mixture of reactants (A), (B) and (C) in an amount ranging from about 6.0 to about 9.0 and preferably from about 6.5 to about 8.0 weight percent based on the weight of the polymeric reaction product.

As noted hereinabove the random linear block copolyesters of the present invention have been found to be especially useful in the production of extruded and molded articles such as films, tapes and sheeting products possessing superior clarity, appearance and at least equivalent if not better slip or nonblocking characteristics compared to products prepared from polyester resins containing merely additive type slip agents.

BEST MODE FOR CARRYING OUT THE INVENTION

As demonstrated hereinbelow, the block copolyesters of the present invention are prepared by conventional processes and techniques employed in the production of polyesters. In accordance therewith the block copolyesters are prepared by first subjecting the mixture of reactants from which they are derived to either transesterification or esterification reaction conditions followed by subsequent polycondensation of either the transesterification or esterification reaction product. In general the transesterification reaction, involving reaction between a dialkyl ester of a dicarboxylic acid and glycol, will be conducted at elevated temperatures ranging from about 170° C. to about 205° C. and preferably from about 185° C. to about 200° C. under an inert gas atmosphere such as nitrogen. In addition, a catalyst will usually be employed to promote the transesterification reaction such as soluble lead and titanium compounds representatives of which include litharge, lead acetate, glycol titanates and the like as well as other well known transesterification catalysts such as compounds of zinc, magnesium, calcium and manganese. In many instances the soluble lead and titanium compounds may be preferred since these catalysts are also known to promote the formation of highly polymeric products in the subsequent polycondensation stage.

The esterification reaction involving reaction between a free dicarboxylic acid and a glycol with the evolution of water also is carried out at elevated temperatures and, in addition, elevated pressures employing inert gas atmospheres. Usually the reaction temperatures will range from about 220° C. to about 270° C. and pressures from about 30 to about 40 pounds per square inch (2.0-3.0 kilograms per square centimeter). The reaction can be carried out either in the presence or absence of catalysts. When catalysts are employed, those normally indicated in the art as being useful include compounds of metals such as zinc, lead, antimony, manganese, zirconium and the like. The reaction can also be carried out in the presence of low molecular weight polymeric solvent such as described in U.S. Pat. No. 4,020,049, the teachings of which are incorporated herein by reference.

The polycondensation reaction, the final preparation step in the production of the block copolyesters of the present invention, is also carried out employing well known techniques and conditions. Thus in the polycondensation step elevated temperatures, reduced pressures and inert atmospheres are utilized during the polymerization of the transesterification or esterification reaction product to the desired final product. Temperatures employed in this reaction step will generally range from about 260° C. to about 300° C. and preferably from about 270° C. to about 285° C. while pressures will range from about 1.0 to 0.1 millimeter of mercury pressure. Catalysts useful in promoting the polycondensation reaction include, in addition to the soluble lead and titanium catalysts noted above, various known compounds of antimony, niobium and germanium such as antimony trioxide, niobium pentoxide, germanium dioxide and the like. Normally these catalysts will be added to the transesterification or esterification reaction product when the formation of said product is fairly complete and before the polycondensation step is begun.

The following examples illustrate but do not limit the scope of the present invention. The dihydroxy terminated polydimethylsiloxane block copolymer used in preparing the block copolyesters in the examples below was DOW CORNING's Q4-3667 and is identified in the examples as "silicone diol". This commercially available ABA type block copolymer is characterized by DOW CORNING as a liquid silicone polycarbinol having a molecular weight of approximately 2400, a viscosity of 320 centipoises, a flash point of 140.5° C., a refractive index of 1.44 and a pour point of 18.3° C. All mol percentages are based on the total number of mols of the free dicarboxylic acid(s) and/or lower dialkyl ester(s) of dicarboxylic acids present in the reaction mixture. All weight percentages are based on the total weight of the polymeric reaction product, i.e., the block copolyesters constituting the present invention, resulting from reaction of the mixture of reactants (A), (B)

and (C) defined herein. Intrinsic viscosities (I.V.) were determined employing a 60/40 phenol/tetrachloroethane mixed solvent system and measured in a No. 1 Ubbelohde viscosimeter at 30° C. using concentrations of 0.4 gram of sample per 100 cubic centimeters of mixed solvent. All film samples were conditioned and the coefficients of friction (both static and kinetic) thereof determined in accordance with ASTM test D-1894-78. Haze values for these films were tested in accordance with ASTM test D-1003.

EXAMPLE 1

(Control)

Employing the general process as described in U.S. Pat. No. 4,020,049 there was prepared a random, linear thermoplastic block copolymer of the present invention as follows:

To a 9.5 gallon (36.0 liter) capacity stainless steel reactor equipped with a stirrer and distillation column there was added 20.81 pounds (9.44 kilograms) of terephthalic acid (TPA) and 9.32 pounds (4.23 kilograms) of ethylene glycol (EG). The reactor was pressurized to 35 pounds per square inch (241.32 kPa) pressure and the mixture therein heated, with continuous stirring, to about 268° C. for 4.5 hours. At the end of this time 1140 grams of by-product water had been distilled from the reactor. Heating and stirring of the reaction mixture (low molecular weight polymer) were continued for an additional one hour beyond this point.

To the above reaction product which functions as a solvent for the following esterification reaction were added 17.3 pounds (7.85 kilograms) of TPA and 7.74 pounds (3.5 kilograms; 120 mol percent) of EG. This mixture was reacted for two hours at a temperature of from 255° C. to 268° C. under a pressure of 35 pounds per square inch (241.32 kPa) until 1260 grams of by-product water had been collected. At this point a portion of the reaction mixture, equivalent to the weight of the product of the reaction of 17.3 pounds (7.85 kilograms) of TPA and 7.74 pounds (3.5 kilograms) of EG or approximately 20.1 pounds (1.1 kilograms) was transferred to a 10.4 gallon (39.4 liters) capacity stainless steel polymerization vessel equipped with a stirrer, distillation column and vacuum line. To the reaction mixture in this polymerization vessel were then added 204 grams (2.25 weight percent) of the silicone diol and 168.6 grams of an ethylene glycol solution containing 11.0 grams of antimony trioxide ($Sb_2O_3$) per 1000 grams of ethylene glycol as catalyst. Over the next 65 minutes the temperature of the reaction mixture was increased from 258° C. to 272° C. and the pressure in the polymerization vessel decreased from atmospheric pressure to 1.0 millimeter of mercury pressure (0.133 kPa). The reaction mixture was then heated an additional 30 minutes at 269° C. to 277° C. and a pressure of 0.20 millimeter of mercury (0.026 kPa). At the end of this time the copolyester product was discharged from the reactor and determined to have an I.V. of 0.507.

EXAMPLE 2

(Control)

To a 9.5 gallon (36.0 liter) capacity stainless steel reactor equipped with a stirrer and distillation column there was added 4.71 kilograms (10.4 pounds) of terephthlatic acid (TPA) and 2.13 kilograms (4.7 pounds) of ethylene glycol (EG). The reactor was pressurized to 35 pounds per square inch (241.32 kPa) pressure and the mixture therein heated, with continuous stirring to about 268° C. for 4.5 hours. At the end of this time 570 milliliters of by-product water had been distilled from the reactor. Heating and stirring of the reaction mixture (low molecular weight polymer) were continued for an additional 60 minutes beyond this point.

To the above reaction product which functions as a solvent for the following esterification reaction were added 8.66 kilograms (19.1 pounds) of TPA and 3.9 kilograms (8.6 pounds) of EG. This mixture was reacted for 230 minutes at a temperature of from 213° C. to 272° C. under a pressure of 35 pounds per square inch (241.32 kPa) until 2340 milliters of by-product water had been collected. At this point a portion of the reaction mixture, equivalent to the weight of the product of the reaction of 8.66 kilograms (19.1 pounds) of TPA and 3.9 kilograms (8.6 pounds) was transferred to a 10.4 gallon (39.4 liters) capacity stainless steel polymerization vessel equipped with a stirrer, distillation column and vacuum line. To the reaction mixture in this polymerization vessel were then added 159 grams (3.5 weight percent) of the silicone diol and 87 grams of an ethylene glycol solution containing 210 grams of antimony trioxide ($Sb_2O_3$) per 1000 grams of ethylene glycol as catalyst. Over the next 80 minutes the temperature of the reaction mixture was increased from 255° C. to 267° C. and the pressure in the polymerization vessel decreased from atmospheric pressure to 1.0 millimeters of mercury pressure (0.133 kPa). The reaction mixture was then heated an additional 130 minutes at 270° C. and at a pressure of 0.4 millimeters of mercury (0.052 kPa). At the end of this time the copolyester product was discharged from the reactor and determined to have an I.V. of 0.574.

EXAMPLES 3-7

Example 1 was repeated in all respects with the following exceptions. The amount of TPA and EG added to the low molecular weight reaction product prepared in the first step varied, the amount of $Sb_2O_3$/EG catalyst solution and the weight of silicone diol added. See Table I for the respective amounts of Examples 3-7.

TABLE I

| Example | TPA (kg) | EG (kg) | $SbO_3$/EG Solution (g) | Silicone Diol | Final I.V. of Product |
|---|---|---|---|---|---|
| 3 | 6.49 | 2.90 | 166.7 | 374.2 g (5.0 wgt %) | .498 |
| 4 | 6.49 | 2.90 | 166.7 | 449.1 g (6.0 wgt %) | .484 |
| 5 | 6.49 | 2.90 | 140.0 | 524 g (7.0 wgt %) | .467 |
| 6 | 6.49 | 2.90 | 166.7 | 598.8 g (8.0 wgt %) | .463 |
| 7 | 6.49 | 2.90 | 166.7 | 673.6 g (9.0 wgt %) | .437 |

EXAMPLE 8

To a 9.5 gallon (36.0 liter) capacity stainless steel reactor equipped with a stirrer and distillation column there was added 5.62 kilograms (12.4 pounds) of TPA and 2.54 kilograms (4.7 pounds) of EG. The reactor was pressurized to 35 pounds per square inch (241.32 kPa) pressure and the mixture therein heated, with continuous stirring to about 268° C. for 4½ hours. During this by-product water had been distilled from the reactor. Heating and stirring of the reaction mixture (low molecular weight polymer) were continued for an additional 60 minutes beyond this point.

To the above reaction roduct which functions as a solvent for the following esterification reaction were added 4.72 kilograms (10.4 pounds) of TPA and 2.13 kilograms (4.7 pounds) of EG. This mixture was reacted for 2 hours at a temperature of from 245° C. to 272° C. under a pressure of 35 pounds per square inch (2.5 kilograms/square centimeters) until 920 milliliters of by-product water had been collected. At this point a portion of the reaction mixture, equivalent to the weight of the product of the reaction of 4.72 kilograms (10.4 pounds) of TPA and 2.14 kilograms (4.7 pounds) of EG were transferred to a 10.4 gallon (39.4 liters) capacity stainless steel polymerization vessel equipped with a stirrer, distillation column and vacuum line. To the reaction mixture in ths polymerization vessel were then added 544.3 grams (10.0 weight percent) of the silicone diol and 95.3 grams of an ethylene glycol solution containing 210 grams of antimony trioxide ($SbO_3$) per 1000 grams of ethylene glycol as catalyst. Over the next 90 minutes the temperature of the reaction mixture was increased from 256° C. to 272° C. and the pressure in the polymerization vessel decreased from atmospheric pressure to 1.0 millimeters of mercury pressure (Kpa). The reaction mixture was then heated an additional hour at a temperature of from 273° C. to 276° C. and at a pressure of from 0.6 to 0.4 millimeters of mercury (0.78 to 0.052 kPa). At the end of this time the copolyester product was discharged from the reaction and determined to have an I.V. of 0.408.

EXAMPLE 9

Example 8 was repeated in all respects with the following exceptions. The amount of silicone diol was increased to 653.2 grams (12.0 weight percent). The copolyester obtained was determined to have an I.V. of 0.420.

Samples of the block copolyesters prepared in Examples 1–9 were flat die extruded into nonoriented films of nominal 10 to 12 mil thickness. Thereafter five inch squares of the above extruded sheeting were clamped into a biaxial orienting unit which was placed into a constant temperature oven. Following conditioning for one minute at 100° C., the film was stretched to a 3×3 draw ratio. The oriented film thickness was in the order of 1–2 mils.

The 9 samples of oriented films were tested immediately after orientation by ASTM test D-1894-78 with the exception that ASTM test D-1894-78 calls for a minimum "conditioning" period of 40 hours at 23±2° C. and 50±5% relative humidity. The various properties of the biaxially oriented films are presented in Table II below.

TABLE II

| Example | Weight percent of silicone diol | Coefficient of Friction Static | Coefficient of Friction Kinetic |
|---|---|---|---|
| Control* | 0.00 | 10.5 | 10.5 |
| 1 | 2.25 | 2.5 | 2.15 |
| 2 | 3.50 | 2.5 | 1.9 |
| 3 | 5.0 | .93 | .5 |
| 4 | 6.0 | .50 | .45 |
| 5 | 7.0 | .47 | .4 |
| 6 | 8.0 | .42 | .33 |
| 7 | 9.0 | .32 | .23 |
| 8 | 10.0 | .24 | .22 |

TABLE II-continued

| Example | Weight percent of silicone diol | Coefficient of Friction Static | Coefficient of Friction Kinetic |
|---|---|---|---|
| 9 | 12.0 | .17 | .20 |

*Comparative film example flat die extruded from .72 I.V. polyethylene terephthalate resin containing no slip agent that was subsequently biaxially oriented (3 × 3).

The haze values for the biaxially oriented films of Examples 1–9 and an unmodified PET resin containing no slip agent were determined in accordance with ASTM test D1003. Table III lists the results.

TABLE III

| Example | Percent Silicone Diol | Percent Haze (Hunter) |
|---|---|---|
| (Control)* | 0.0 | 1.10 |
| 1 (control) | 2.25 | 1.25 |
| 2 (control) | 3.50 | 1.25 |
| 3 | 5.00 | 3.50 |
| 4 | 6.00 | 3.80 |
| 5 | 7.00 | 6.40 |
| 6 | 8.00 | 7.10 |
| 7 | 9.00 | 8.50 |
| 8 | 10.00 | 10.00 |
| 9 | 12.00 | 45.00 |

*Comparative film example flat die extruded from .72 I.V. polyethylene terephthalate resin containing no slip agent that was subsequently biaxially oriented (3 × 3).

I claim:
1. A polyester film which has excellent slip characteristics and excellent haze values which is comprised of a random, linear, thermoplastic block copolyester consisting essentially of the polymeric reaction product of a mixture of reactants comprising
   (A) at least one reactant selected from the groups of reactants consisting of
      (1) aromatic dicarboxylic acids or the $C_1$ to $C_4$ dialkyl esters thereof and
      (2) aliphatic dicarboxylic acids or the $C_1$ to $C_4$ dialkyl esters thereof
   wherein the reactant selected from group (1) constitutes from 100 to 50 mol percent of the total mols of reactant (A) and the reactant selected from group (2) constitutes from 0 to 50 mol percent of the total mols of reactant (A);
   (B) from about 100 to about 300 mol percent, based on the total mols of reactant (A) of at least one reactant selected from the group consisting of alkylene glycols containing from 2 to 10 carbon atoms; and
   (C) from about 5.00 to about 12.0 weight percent, based on the weight of the polymeric reaction product, of a dihydroxy terminated polydimethylsiloxane block copolymer of the general formula

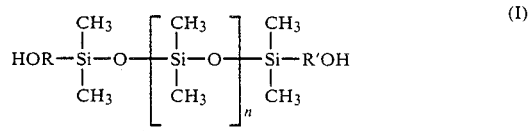

wherein n is an integer ranging from about 8 to about 15 and R and R' are divalent polymethylene oxide radicals corresponding to the formulae

and $$-(CH_2)_x[O-(CH_2)_x]_yO-(CH_2)_x \qquad (III)$$

respectively and wherein x is an integer ranging from about 2 to about 8 and y is an integer ranging from about 8 to about 15 to provide said block copolymer with a molecular weight ranging from about 1600 to about 5500; wherein said polyester film has been biaxially oriented and has a kinetic coefficient of friction of less than 0.55 and a haze value of from 3.5% to 14% as determined by ASTM Test D-1003.

2. A polyester film as specified in claim 1 wherein said copolyester consists essentially of the polymeric reaction product of said mixture of reactants (A), (B) and (C) wherein reactant (A) is selected from the group (1) reactants consisting of aromatic dicarboxylic acids or the $C_1$ to $C_4$ dialkyl esters thereof reactant (B) is selected from alkylene glycols containing from 2 to 6 carbon atoms and reactant (C) is a dihydroxy terminated polydimethylsiloxane block copolymer corresponding to the general formula

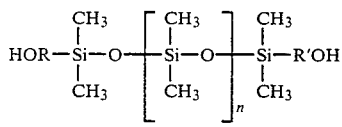

where n is an integer ranging from about 10 to about 13 and the divalent polymethylene oxide radicals correspond to the general formulae $$-CH_2)_xO-CH_2)_xO]_y(CH_2)_x \qquad (II)$$

and $$-CH_2)_x[O-CH_2)_x]_yO-CH_2)_x \qquad (III)$$

wherein the integer x ranges from about 2 to about 4 and the integer y ranges from about 10 to about 13 said reactant (C) comprising from about 5.0 to about 8.0 weight percent, based on the weight of the polymeric reaction product, of said mixture of reactants.

3. A polyester film as specified in claim 2 wherein said copolyester consists essentially of the polymeric reaction product of the mixture of reactants (A), (B) and (C) wherein reactant (A) is selected from the group consisting of terephthalic acid and dimethyl terephthalate.

4. A polyester film as specified in claim 3 wherein said copolyester consists essentially of the polymeric reaction product of the mixture of reactants (A), (B) and (C) wherein reactant (B) ranges from about 100 to about 250 mol percent, based on the total moles of reactant (A), and wherein reactant (B) is ethylene glycol.

5. A polyester film as specified in claim 4 wherein said copolyester consists essentially of the polymeric reaction product of the mixture of reactants (A), (B) and (C) wherein reactant (C) is the dihydroxy terminated polydimethylsiloxane block copolymer corresponding to the general formula (1) in which the integer n ranges from about 10 to about 13, the integer x of the divalent radicals R and $R^1$ therein corresponding to the formula (II) and (III) is 2 and the integer y of the divalent radicals R and $R^1$ therein corresponding to the formulae (II) and (III) ranges from about 10 to about 13 and wherein the molecular weight of reactant (C) ranges from about 1900 to about 2400.

6. A polyester film as specified in claim 5 wherein said copolyester consists essentially of the polymeric reaction product of the mixture of reactants (A), (B) and (C) wherein reactant (C) comprises from about 6.0 to about 7.0 weight percent based on the weight of said polymeric reaction product.

7. A polyester film as specified in claim 5 wherein said copolyester consists essentially of the polymeric reaction product of the mixture of reactants (A), (B) and (C) wherein reactant (C) has a molecular weight of about 2400, a viscosity of about 320 centipoises, a flash point of about 140.5° C., a refractive index of 1.44 and a pour point of about 183° C.

8. A polyester film as specified in claim 7 wherein said film is characterized by having a static coefficient of friction of less than 0.1 and a kinetic coefficient of friction of less than 0.55, as measured in accordance with ASTM test D-1894-78.

9. A polyester film as specified in claim 8 wherein said film exhibits a Hunter Haze value of from 3.5 to 45.0 and a static coefficient of friction of from 0.95 to 0.15 and a kinetic coefficient of friction of from 0.55 to 0.15.

* * * * *